(12) United States Patent
Thorstensen-Woll

(10) Patent No.: US 10,196,174 B2
(45) Date of Patent: *Feb. 5, 2019

(54) TAMPER EVIDENT TABBED SEALING MEMBER HAVING A FOAMED POLYMER LAYER

(71) Applicant: Selig Sealing Products, Inc., Forrest, IL (US)

(72) Inventor: Robert William Thorstensen-Woll, Barrie (CA)

(73) Assignee: Selig Sealing Products, Inc., Forrest, IL (US)

( * ) Notice: Subject to any disclaimer, the term of this patent is extended or adjusted under 35 U.S.C. 154(b) by 350 days.

This patent is subject to a terminal disclaimer.

(21) Appl. No.: 14/706,263

(22) Filed: May 7, 2015

(65) Prior Publication Data

US 2015/0232229 A1 Aug. 20, 2015

Related U.S. Application Data

(62) Division of application No. 13/603,998, filed on Sep. 5, 2012, now Pat. No. 9,028,963.

(51) Int. Cl.
*B65D 17/28* (2006.01)
*B65D 43/02* (2006.01)
*B65D 65/40* (2006.01)

(52) U.S. Cl.
CPC ..... *B65D 17/4012* (2018.01); *B65D 43/0285* (2013.01); *B65D 65/40* (2013.01); *B65D 2543/00425* (2013.01); *B65D 2543/00833* (2013.01)

(58) Field of Classification Search
CPC ... B65D 17/165; B65D 43/0285; B65D 65/40
See application file for complete search history.

(56) References Cited

U.S. PATENT DOCUMENTS

| | | | |
|---|---|---|---|
| 2,768,762 | A | 10/1956 | Guinet |
| 3,235,165 | A | 2/1966 | Jackson |
| 3,292,828 | A | 12/1966 | Stuart |
| 3,302,818 | A | 2/1967 | Balocca et al. |
| 3,460,310 | A | 8/1969 | Adcock et al. |
| 3,556,816 | A | 1/1971 | Nughes |
| 3,964,670 | A | 6/1976 | Amneus |
| 3,990,603 | A | 11/1976 | Brochman |

(Continued)

FOREIGN PATENT DOCUMENTS

| | | |
|---|---|---|
| AT | 501393 A1 | 8/2006 |
| AT | 11738 U1 | 4/2011 |

(Continued)

OTHER PUBLICATIONS

Patent Cooperation Treaty, International Search Report and Written Opinion dated May 7, 2015 for International Application No. PCT/US2015/014363, 3 pages.

*Primary Examiner* — Victor S Chang
(74) *Attorney, Agent, or Firm* — Fitch, Even, Tabin & Flannery, LLP

(57) ABSTRACT

A pull-tab sealing member for a container providing a foamed polymer layer positioned within the sealing member for effective heat sealing to the container together with a lower laminate below a tab capable of tearing to provide a tamper evident structure below the tab.

6 Claims, 2 Drawing Sheets

(56) References Cited

U.S. PATENT DOCUMENTS

| | | |
|---|---|---|
| 4,133,796 A | 1/1979 | Bullman |
| 4,206,165 A | 6/1980 | Dukess |
| 4,582,735 A | 4/1986 | Smith |
| 4,588,099 A | 5/1986 | Diez |
| 4,596,338 A | 6/1986 | Yousif |
| 4,636,273 A | 1/1987 | Wolfersperger |
| 4,666,052 A | 5/1987 | Ou-Yang |
| 4,693,390 A | 9/1987 | Hekal |
| 4,735,335 A | 4/1988 | Torterotot |
| 4,741,791 A | 5/1988 | Howard |
| 4,770,325 A | 9/1988 | Gordon |
| 4,781,294 A | 11/1988 | Croce |
| 4,801,647 A | 1/1989 | Wolfe, Jr. |
| 4,811,856 A | 3/1989 | Fischman |
| 4,818,577 A | 4/1989 | Ou-Yang |
| 4,837,061 A | 6/1989 | Smits |
| 4,863,061 A | 9/1989 | Moore |
| 4,867,881 A | 9/1989 | Kinzer |
| 4,889,731 A | 12/1989 | Williams |
| 4,938,390 A | 7/1990 | Markva |
| 4,960,216 A | 10/1990 | Giles |
| 4,961,986 A | 10/1990 | Galda |
| 5,004,111 A | 4/1991 | McCarthy |
| 5,015,318 A | 5/1991 | Smits |
| 5,053,457 A | 10/1991 | Lee |
| 5,055,150 A | 10/1991 | Rosenfeld |
| 5,057,365 A | 10/1991 | Finkelstein |
| 5,071,710 A | 12/1991 | Smits |
| 5,098,495 A | 3/1992 | Smits |
| RE33,893 E | 4/1992 | Elias |
| 5,125,529 A | 6/1992 | Torterotot |
| 5,131,556 A | 7/1992 | Iioka |
| 5,149,386 A | 9/1992 | Smits |
| 5,178,967 A | 1/1993 | Rosenfeld |
| 5,197,618 A | 3/1993 | Goth |
| 5,217,790 A | 6/1993 | Galda |
| 5,226,281 A | 7/1993 | Han |
| 5,265,745 A | 11/1993 | Pereyra |
| 5,433,992 A | 7/1995 | Galda |
| 5,513,781 A | 5/1996 | Ullrich |
| 5,514,442 A | 5/1996 | Galada et al. |
| 5,560,989 A | 10/1996 | Han |
| 5,598,940 A | 2/1997 | Finkelstein |
| 5,601,200 A | 2/1997 | Finkelstein |
| 5,615,789 A | 4/1997 | Finkelstein |
| 5,618,618 A | 4/1997 | Murschall |
| 5,669,521 A | 9/1997 | Wiening |
| 5,702,015 A | 12/1997 | Giles |
| 5,860,544 A | 1/1999 | Brucker |
| 5,871,112 A | 2/1999 | Giles |
| 5,915,577 A | 6/1999 | Levine |
| 5,975,304 A | 11/1999 | Cain |
| 6,082,566 A | 7/2000 | Yousif |
| 6,096,358 A | 8/2000 | Murdick |
| 6,131,754 A | 10/2000 | Smelko |
| 6,139,931 A | 10/2000 | Finkelstein |
| 6,158,632 A | 12/2000 | Ekkert |
| 6,194,042 B1 | 2/2001 | Finkelstein |
| 6,290,801 B1 | 9/2001 | Krampe |
| 6,312,776 B1 | 11/2001 | Finkelstein |
| 6,378,715 B1 | 4/2002 | Finkelstein |
| 6,458,302 B1 | 10/2002 | Shifflet |
| 6,548,302 B1 | 4/2003 | Mao |
| 6,602,309 B2 | 8/2003 | Vizulis |
| 6,627,273 B2 | 9/2003 | Wolf |
| 6,699,566 B2 | 3/2004 | Zeiter |
| 6,705,467 B1 | 3/2004 | Kancsar |
| 6,722,272 B2 | 4/2004 | Jud |
| 6,767,425 B2 | 7/2004 | Meier |
| 6,790,508 B2 | 9/2004 | Razeti |
| 6,866,926 B1 | 3/2005 | Smelko |
| 6,902,075 B2 | 6/2005 | OBrien |
| 6,916,516 B1 | 7/2005 | Gerber |
| 6,955,736 B2 | 10/2005 | Rosenberger |
| 6,974,045 B1 | 12/2005 | Trombach |
| 7,128,210 B2 | 10/2006 | Razeti |
| 7,182,475 B2 | 2/2007 | Kramer |
| 7,217,454 B2 | 5/2007 | Smelko |
| RE39,790 E | 8/2007 | Fuchs |
| 7,316,760 B2 | 1/2008 | Nageli |
| 7,448,153 B2 | 11/2008 | Maliner |
| 7,531,228 B2 | 5/2009 | Perre |
| 7,648,764 B2 | 1/2010 | Yousif |
| 7,713,605 B2 | 5/2010 | Yousif |
| 7,740,730 B2 | 6/2010 | Schedl |
| 7,740,927 B2 | 6/2010 | Yousif |
| 7,789,262 B2 | 9/2010 | Niederer |
| 7,798,359 B1 | 9/2010 | Marsella |
| 7,819,266 B2 | 10/2010 | Ross |
| 7,838,109 B2 | 11/2010 | Declerck |
| 7,850,033 B2 | 12/2010 | Thorstensen-Woll |
| 8,057,896 B2 | 11/2011 | Smelko |
| 8,129,009 B2 | 3/2012 | Morris |
| 8,308,003 B2 | 11/2012 | O'Brien |
| 8,329,288 B2 | 12/2012 | Allegaert |
| 8,348,082 B2 | 1/2013 | Cain |
| 8,906,185 B2 | 12/2014 | McLean |
| 9,028,963 B2 * | 5/2015 | Thorstensen-Woll ........................ B65D 77/10 428/343 |
| 9,102,438 B2 | 8/2015 | Thorstensen-Woll |
| 9,221,579 B2 | 12/2015 | Thorstensen-Woll |
| 9,227,755 B2 | 1/2016 | Thorstensen-Woll |
| 9,440,765 B2 | 9/2016 | Thorstensen-Woll |
| 9,533,805 B2 | 1/2017 | McLean |
| 9,676,513 B2 | 6/2017 | Thorstensen-Woll |
| 2001/0031348 A1 | 10/2001 | Jud |
| 2002/0068140 A1 | 6/2002 | Finkelstein |
| 2003/0087057 A1 | 5/2003 | Blemberg |
| 2003/0168423 A1 | 9/2003 | Williams |
| 2003/0196418 A1 | 10/2003 | O'Brien |
| 2004/0043238 A1 | 3/2004 | Wuest |
| 2004/0109963 A1 | 6/2004 | Zaggia |
| 2005/0048307 A1 | 3/2005 | Schubert |
| 2005/0208242 A1 | 9/2005 | Smelko |
| 2005/0208244 A1 | 9/2005 | Delmas |
| 2005/0218143 A1 | 10/2005 | Niederer |
| 2006/0000545 A1 | 1/2006 | Nageli |
| 2006/0003120 A1 | 1/2006 | Nageli |
| 2006/0003122 A1 | 1/2006 | Nageli |
| 2006/0124577 A1 | 6/2006 | Ross |
| 2006/0151415 A1 | 7/2006 | Smelko |
| 2006/0278665 A1 | 12/2006 | Bennett |
| 2007/0003725 A1 | 1/2007 | Yousif |
| 2007/0065609 A1 | 3/2007 | Korson |
| 2007/0267304 A1 | 11/2007 | Portier |
| 2007/0298273 A1 | 12/2007 | Thies |
| 2008/0026171 A1 | 1/2008 | Gullick |
| 2008/0073308 A1 | 3/2008 | Yousif |
| 2008/0103262 A1 | 5/2008 | Haschke |
| 2008/0145581 A1 | 6/2008 | Tanny |
| 2008/0156443 A1 | 7/2008 | Schaefer |
| 2008/0169286 A1 | 7/2008 | McLean |
| 2008/0231922 A1 | 9/2008 | Thorstensen-Woll |
| 2008/0233339 A1 | 9/2008 | Thorstensen-Woll |
| 2008/0233424 A1 | 9/2008 | Thorstensen-Woll |
| 2009/0078671 A1 | 3/2009 | Triquet |
| 2009/0208729 A1 | 8/2009 | Allegaert |
| 2009/0304964 A1 | 12/2009 | Sachs |
| 2010/0009162 A1 | 1/2010 | Rothweiler |
| 2010/0030180 A1 | 2/2010 | Deckerck |
| 2010/0047552 A1 | 2/2010 | McLean |
| 2010/0059942 A1 | 3/2010 | Rothweiler |
| 2010/0116410 A1 | 5/2010 | Yousif |
| 2010/0155288 A1 | 6/2010 | Harper |
| 2010/0170820 A1 | 7/2010 | Leplatois |
| 2010/0193463 A1 | 8/2010 | OBrien |
| 2010/0213193 A1 | 8/2010 | Helmlinger |
| 2010/0221483 A1 | 9/2010 | Gonzalez Carro |
| 2010/0290663 A1 | 11/2010 | Trassl |
| 2010/0314278 A1 | 12/2010 | Fonteyne |
| 2011/0000917 A1 | 1/2011 | Wolters |
| 2011/0005961 A1 | 1/2011 | Leplatois |
| 2011/0089177 A1 | 4/2011 | Thorstensen-Woll |

(56) References Cited

U.S. PATENT DOCUMENTS

| | | | |
|---|---|---|---|
| 2011/0091715 A1 | 4/2011 | Rakutt | |
| 2011/0100949 A1 | 5/2011 | Grayer | |
| 2011/0100989 A1 | 5/2011 | Cain | |
| 2011/0138742 A1 | 6/2011 | McLean | |
| 2011/0147353 A1 | 6/2011 | Kornfeld | |
| 2012/0000910 A1 | 1/2012 | Ekkert | |
| 2012/0043330 A1 | 2/2012 | McLean | |
| 2012/0067896 A1 | 3/2012 | Daffner | |
| 2012/0070636 A1* | 3/2012 | Thorstensen-Woll | B65D 77/2032 428/200 |
| 2012/0103988 A1 | 5/2012 | Wiening | |
| 2012/0111758 A1 | 5/2012 | Lo | |
| 2012/0241449 A1 | 9/2012 | Frischmann | |
| 2012/0285920 A1 | 11/2012 | McLean | |
| 2013/0020324 A1 | 1/2013 | Thorstensen-Wolf | |
| 2013/0121623 A1 | 5/2013 | Lyzenga | |
| 2013/0177263 A1 | 7/2013 | Duan | |
| 2014/0001185 A1 | 1/2014 | McLean | |
| 2014/0061196 A1 | 3/2014 | Thorstensen-Woll | |
| 2014/0186589 A1 | 7/2014 | Chang | |
| 2014/0224800 A1 | 8/2014 | Thorstensen-Woll | |
| 2017/0253373 A1 | 9/2017 | Thorstensen-Woll | |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 A1 | 10/1997 |
| CN | 1301289 A | 6/2001 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0135431 A1 | 3/1985 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9905041 A1 | 2/1999 |
| WO | 2000066450 | 11/2000 |
| WO | 2005009868 A1 | 2/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2015119988 A1 | 8/2015 |

* cited by examiner

TAMPER EVIDENT TABBED SEALING MEMBER HAVING A FOAMED POLYMER LAYER

CROSS-REFERENCE TO RELATED APPLICATION

This application is a divisional of prior application Ser. No. 13/603,998, filed Sep. 5, 2012, which is hereby incorporated herein by reference in its entirety.

FIELD

The disclosure relates to a pull-tab sealing member for closing the mouth of a container, and more particularly, to tamper evident pull-tab sealing member.

BACKGROUND

It is often desirable to seal the opening of a bottle, jar or other container opening using a sealing member to maintain freshness and/or to indicate whether the container has been tampered with. The sealing member often includes a tab to help a consumer remove the sealing member from the container. In use, a user seeking to gain access to the contents of the container simply grips the tab with their fingers and, by pulling on the tab, can remove the sealing member and access the contents of the container in a relatively convenient manner. One example of such a sealing member is described in U.S. Pat. No. 6,866,926. Such sealing members have a hinged tab positioned above a lower seal laminate. The lower seal laminate of these prior sealing members generally includes a heat sealable layer for bonding to the container rim, a metal foil layer for generating heat, and a foam insulation layer above and abutting the foil layer for retaining heat in the lower portion of the seal for activating the heat seal layer.

The foam insulation layer is advantageous in the lower seal laminate under the tab because, with its close proximity to the foil, it helps insulate and protect the upper layers and tab from damage or melting due to the heat experienced by the seal during heat sealing. In particular, the foam helps protect a bonding layer that secures the tab to the lower seal laminate. Often, the bonding layer has a lower melt point that renders it susceptible to melting during field use when an end user applies heat to secure the seal to a container. If the bonding layer melts, it can ooze or flow out of the seal and cause a free end of the hinge-type tab to be bonded to the lower seal laminate. This is called tab-grab and is undesirable. End users, in some cases, will often overheat the seal to make sure that a good heat seal is formed. The foam insulation under the bonding layer helps protect this bonding layer from any overheating. The foam insulation layer in prior seals also helps keep heat in the lower layers of the seal to achieve a uniform heat seal to the container rim between the tabbed and non-tabbed sides of the seal.

Sealing members constructed in this manner, however, generally do not allow for a tamper indicating capability where a portion of the lower seal laminate tears upon a user applying a removal force to the tab. Using the foam insulation layer in the lower seal laminate with a sufficient thickness to impart the insulation and heat retention capabilities for heat sealing generally does not allow for easy tearing of the lower seal laminate portions upon seal removal. The thickness of the foam needed to achieve insulation and heat retention results in a laminate that has relatively high internal tear strength. With these prior insulated and tabbed sealing members, therefore, upon a user pulling on the tab, such sealing members separate in one piece from the container generally without leaving any substantial portions thereof across the mouth of the container opening for tamper evidence.

For such tabbed sealing members to properly effect removal thereof from a container via use of the tab, the structure forming the tab generally needs to remain bonded to the lower seal laminate and the tab needs to remain in one piece. Thus, proper functioning of these tabbed seals are generally dependent on the tear strength of the layers forming the tab as well as the bond strength of the tab to the lower seal laminate. Historically, alterations of tab materials or down gauging (i.e., making thinner) the thickness of the various layers forming the tab or the adhesive bonding the tab to the lower seal laminate results in undesired tab separation or tearing upon a removal force being applied to the tab. Tearing of the tab or separation of the tab from the lower seal laminate is undesired because it does not properly result in seal removal.

DETAILED DESCRIPTION

Figure 1:
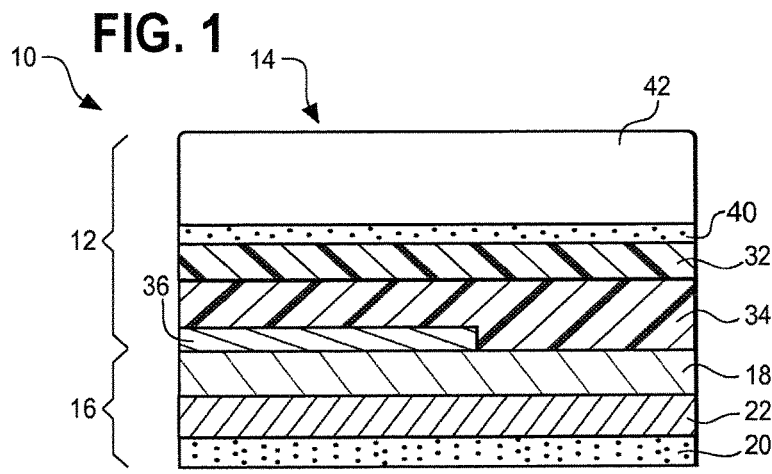
FIG. 1 is a cross-sectional view of an exemplary sealing member.

A pull-tab sealing member for a container is described herein combining the advantages of an insulation layer for effective heat sealing to the container together with a lower laminate below a tab capable of tearing to provide a tamper evident structure. For simplicity, this disclosure generally refers to a container or bottle, but the sealing member may be applied to any type of container, bottle, package or other apparatus having a rim or mouth surrounding an access opening to an internal cavity.

In one aspect, the sealing members herein include a pull or grip tab in an upper laminate portion defined wholly within a perimeter of the sealing member combined with an insulation layer positioned within the sealing member effective to provide the duel advantages of insulation for heat sealing and to permit tearing of the lower laminate of the seal upon a user applying a removal force to the tab. In one approach, the insulation layer is part of the tab and positioned above any bonding layer securing the tab to the lower laminate. In this manner, one portion of the sealing member is removed with the tab and another portion of the seal's lower laminate remains bonded to a container's rim after removal of the sealing member. The portion left on the container after tab and seal removal provides tamper evidence that the container has been used.

In another aspect, the sealing members herein include a lower laminate with heat seal layers such as at least a membrane layer bonded to a heat sealable layer. The membrane layer and heat sealable layer are effective for heat sealing to a rim of a container, such as by induction, conduction, or other heating methods and are configured to provide a weld bond to the container rim. In some approaches, the lower laminate portion is free of or devoid of any foamed polymers, insulation layers, polyester, or other high strength layers that would render the lower laminate incapable of being ripped or torn during seal removal.

In yet another aspect, the sealing members define an upper laminate that is at least partially bonded to the lower laminate to form a gripping tab wholly within a perimeter the sealing member and/or a perimeter of the lower laminate. By one approach, the upper laminate and gripping tab include at least the insulation layer, one or more polymer support layers, and a bonding layer forming the partial bond between the upper laminate and the lower laminate. In some approaches, the bonding layer is a heat-activated bonding layer.

In yet another aspect, in order to effect the benefits of insulation, tab strength, and tearing of the lower laminate, the tab and/or the upper laminate has a construction that is about 50 to about 70 percent insulation layer (based on thickness) combined with effective ratios of a thickness of the support and bonding layers to a total thickness of the upper laminate and/or gripping tab in order to minimize total tab thickness but maximize strength and bonding to the lower layers. At the same time, the tab is configured to minimize and reduce melting and oozing of the bonding layer even though the bonding layer is positioned between the insulation layer and the heat seal layers of the lower laminate. If the bonding layer melts upon heat sealing, it may ooze from the seal and cause undesired bonding of the tab to the lower laminate (i.e., tab grab) or bonding of seal to a cap or other closure. The present seal members minimize or avoid this. The seals of the present disclosure are also capable of using down gauged or thinner layers not found possible in prior seals due, in part, to the effective ratios of layer thickness in the tab, described herein.

Such functionality of the tabbed seal is even retained when the insulation layer is positioned in the tab and spaced from the heat seal layers by one or more, and in some cases, three intervening layers. One of the intervening layers, as mentioned above, may even be the bonding layer holding the tab to the lower laminate. In some cases, the insulation layer may be spaced by about 1 to about 5 mils from the membrane layer (and heat seal layers) and, even with such spacing, the sealing members herein are still effective to provide insulation and retention of adequate heat for the heat seal layers to provide a uniform heat seal. Given the spacing between the insulation and heat seal layers, if the tab falls outside the thickness parameters herein, then the tab and seal may provide unsatisfactory heat sealing, removal characteristics, and tab grab.

In this disclosure, reference to upper and lower surfaces and layers of the components of the sealing member refers to an orientation of the components as generally depicted in figures and when the sealing member is in use with a container in an upright position and having an opening at the top of the container. Different approaches to the sealing member will first be generally described, and then more specifics of the various constructions and materials will be explained thereafter. It will be appreciated that the sealing members described herein will function in both a one-piece or two-piece sealing member configuration. A one-piece sealing member generally includes just the sealing member bonded to a container rim. A cap or closure may be also used therewith. A two-piece sealing member includes the sealing member 10 temporarily bonded to a liner 11. In this construction, the sealing member is bonded to a container's rim, and the liner is configured to separate from the sealing member during heating to be retained in a cap or other closure used on the container. In a two-piece construction, a wax layer 13, for example, may be used to temporarily bond the sealing member to a liner. Other types of releasable layers may also be used to provide a temporary bond between the seal and liner.

Turning to more of the details and as generally shown in FIGS. 1-4, a tamper evident, tabbed sealing member is provided as a laminate formed from flexible sheet materials with a lower laminate portion for bonding to a container's rim and an upper laminate portion forming a gripping tab that is defined wholly within a perimeter of the sealing member. In use, by pulling on the tab, the user can pivot the tab upwardly (i.e., FIGS. 2-3) and use the tab to remove the sealing member to tear the lower laminate portion to gain access to the interior of the container while leaving one or more portions of the lower laminate extending across the container's rim for tamper evidence (i.e., FIG. 4). It should be appreciated that the various layers shown in FIGS. 1-4 are not drawn to scale. It should also be appreciated that as used herein, unless other noted, percentage and parts are by weight.

At least in certain approaches, the lower laminate of the sealing members herein includes a heat sealable layer for bonding to the rim of a container. Above or on top of the heat sealable layer is a membrane or, in some cases, an induction heating layer. The heat sealable layer may include a hot melt adhesive for bonding or securing the sealing member to the container rim by a heat seal or induction sealing apparatus, which heats the membrane layer and melts the heat sealable layer to bond the seal to the rim of the container. To form the tamper evident features, the heat seal may be configured to form a weld to the container rim such that upon removal by the tab, the lower laminate tears to leave a portion thereof bonded to the container rim.

Figure 2:
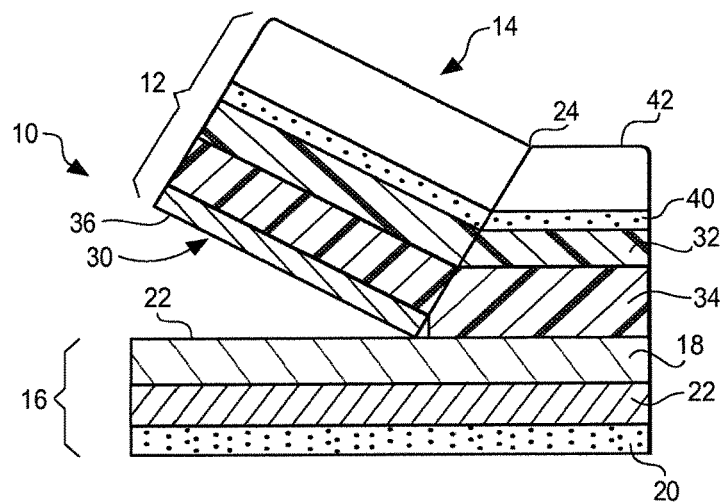
FIG. 2 is a cross-sectional view of an exemplary sealing member.
Figure 3:
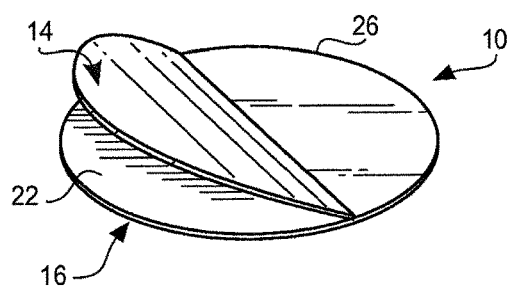
FIG. 3 is a perspective view of an exemplary sealing member.

In one approach and as generally shown in FIGS. 1-3, a tabbed sealing member 10 may include an upper laminate 12 forming a tab structure 14 and a lower seal laminate 16 that can be bonded or welded to a rim of a container. The lower seal laminate 16 may be a laminate or multi-layer sheet including, by one approach, a top layer 18 underneath the tab structure 14 and a lower heat sealable layer 20 effective to secure or weld the seal member to a container rim during an induction sealing or other heat sealing process. In one approach, the lower laminate 16 includes the top layer 18 as a membrane or induction heating layer over and bonded to an upper surface of the lower heat sealable layer 20 via an adhesive layer 22.

In other approaches, the lower seal laminate 16 may also include other layers as needed for a particular application, but is generally free of or devoid of high strength and/or insulation layers such as, polyesters, high strength polymers, foamed polymers, other insulation materials, and the like. For example and in some approaches, the lower seal laminate 16 is generally free of or devoid of polymers and other high strength plastic films with a density of about 1 g/ml or more. In other cases, the lower laminate is generally free of or devoid of such materials with a thickness of more than 2 mils. In yet other cases, the lower laminate 16 is generally free of or devoid of foamed polymers and other insulation layers with a density of less than about 0.9 g/ml and, in some approaches, has no foamed polymers, other insulation layers and the like with thicknesses from about 3 to about 10 mils or more that would render the lower laminate incapable of tearing upon a normal removal force applied during seal removal.

The upper laminate 12 includes the tab structure 14 and may also be a laminate or multi-layer sheet that defines or includes a pull tab or free tab 30 of the tab structure 14 (see, e.g., FIG. 2). By one approach, the free tab 30 is formed wholly within a circumference or perimeter 26 of the sealing member 10 or the lower seal laminate 16 as generally shown in FIGS. 2 and 3 depicting the tab 30 pivoted upwardly. In this approach, the upper laminate 12 also may include a first, optional polymer support layer 32 positioned over and at least partially bonded to the upper layer 18 of the lower seal laminate 16 via an adhesive or bonding layer 34 as shown in FIGS. 1 and 2. As described below, the tab structure may also include a tab stock 36 that is bonded to the first polymer support layer 32, but not the lower seal laminate 16 to form the tab 30. The upper laminate 12 may also include an upper or second polymer support layer 42 on an upper surface of an insulation layer 40. The support layers 32 and 42 may be non-foamed polymers. The insulation layer 40 may be bonded to the support layers 32 and/or 42 via thin adhesive layers (not shown in Figures), such as about 0.2 to about a 0.5 (or less) mil adhesive like a 2-component polyurethane adhesive.

The upper laminate 12 and, in particular, the tab structure 14 thereof includes the insulation layer 40. By one approach, the insulation layer 40 is sandwiched between the optional first polymer support layer 32 and the upper or second polymer support layer 42 to form the tab 30. As described more below, the upper laminate 12 and/or the tab structure 14 has a construction effective to minimize its thickness yet maintain a proper bond to the lower laminate 16 necessary to achieve tearing thereof upon seal removal from a container. It will be appreciated that the upper laminate layer 12 may also include other polymer layers as needed for a particular application. The sandwich of layer 32, 40, and 42 may be effective to support and provide balanced stiffness on both sides of the insulation layer 40 to minimize and prevent curl thereof, especially when exposed to heating during a heat seal process.

The tab structure 14 defines the tab 30 via the tab stock 36 that extends only part way across the surface of the seal. More specifically, the tab stock 36 is a partial layer that extends part-way across the length of the lower laminate 16. Tab stock 36 forms the tab 30 because it bonds to the first polymer layer 32 (or insulation layer 40) via an adhesive bonding layer 34 and prevents layer 32 (or layer 40) from adhering to an upper surface 22 of the lower seal laminate 16 across at least a portion thereof as generally shown in FIG. 2. That is, a top surface of the tab stock 36 is adhered to a lower portion of the first support layer 32 (or insulation layer 40) by bonding layer 34. A bottom surface of tab stock 36 is adjacent to, but not bonded to, the upper surface 22 of the top layer 18 or the lower laminate 16 to form the tab 30. While the relative dimensions of the tab stock 36 are not particularly limited, in some cases the tab stock 36 lies wholly within a circumference or perimeter 26 of the seal 10 and/or lower laminate 16 and, typically, the tab stock 36 occupies about 25 to about 50 percent of surface area of the sealing member 10. In one aspect, the tab stock 36 is formed of polyester, such as polyethylene terephthalate (PET), or paper. By one optional approach, a lower surface of the tab stock 36 may be coated with a release material, for example silicone. The optional release coating minimizes the possibility that the tab stock 36 will become adhered to the upper surface 22 of the lower laminate 16 during the heat sealing or induction heat sealing process. However, such release coatings are not typically necessary. As shown in at least FIG. 2, the tab stock 36 permits the tab structure 14 to pivot or hinge upwardly along a boundary line 24 to form the tab 30. By this approach, the tab stock 36 and formed tab 30 are defined wholly within a circumference or perimeter 26 of the he underside of tab 30.

Figure 4:
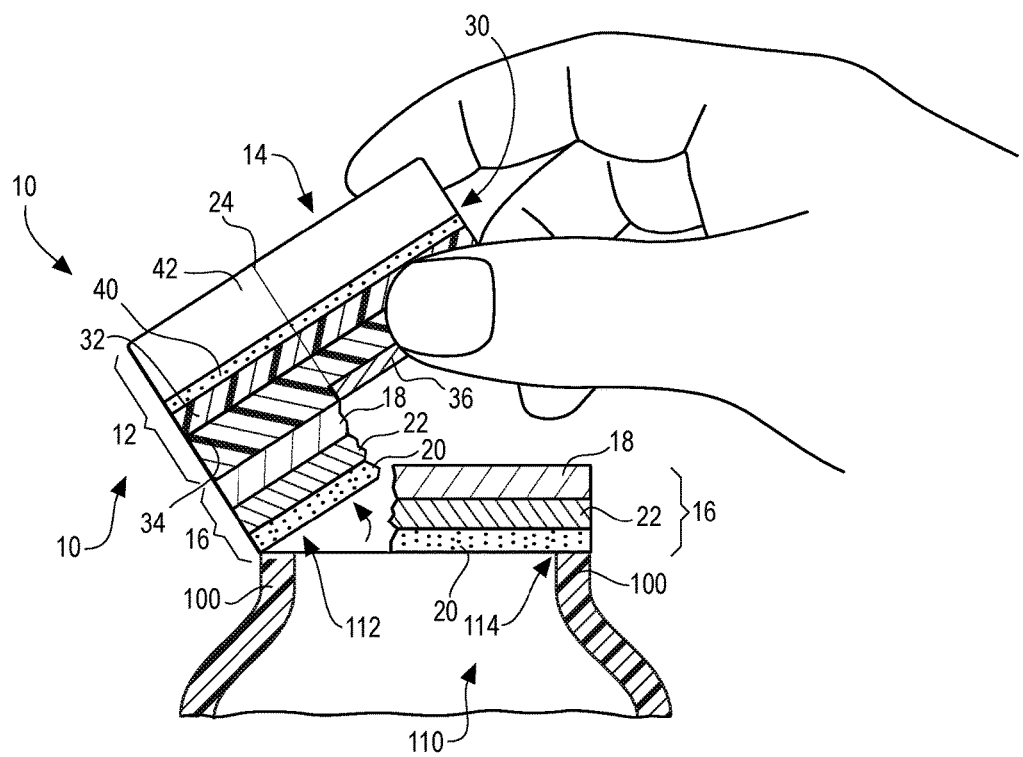
FIG. 4 is a cross-sectional view of an exemplary sealing member illustrating separation or tearing of the sealing member upon a removal force applied to tab.
Figure 5:
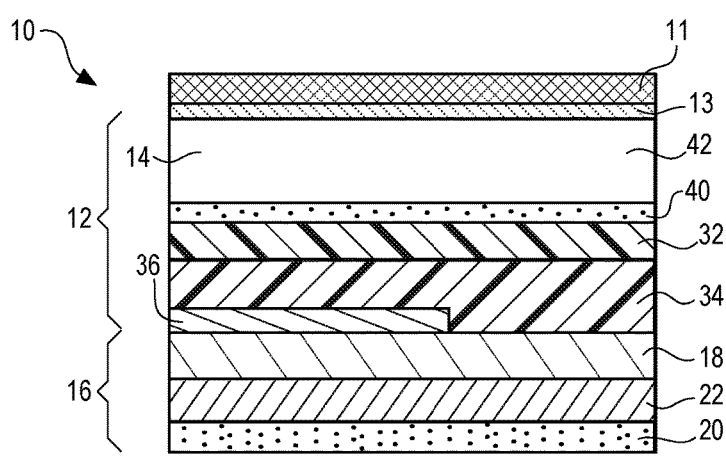
FIG. 5 is a cross-sectional view of an exemplary two-piece sealing member.

Turning to FIG. 4 for a moment, the sealing member 10 is shown upon a removal force being applied to the tab 30 by a user pulling upwardly on the tab 30 from a container's rim 100. Here, the sealing member 10 (and in particular, the lower laminate 16 thereof) tears or rips across a major surface thereof upon pulling of the tab 30. The tearing is, by one approach, across a major surface of the lower seal laminate 16 so that the heat seal layer 20, the adhesive layer 22, and the membrane layer 18 tear into two portions: an adhered portion 110 and a removable portion 112. In use, the adhered portion 110 remains bonded to the container's rim 100 while the removable portion 112 is removed entirely or at least partially from the container's rim 100 as it remains bonded to the upper laminate portion 12 and tab 30. While the tearing may occur adjacent to the boundary 24 as generally shown in FIG. 4, it may also occur at other locations across the major surface of the sealing member 10 depending on the degree and direction of the removal force. The adhered portion 110 may also be one or more separate portions. The ability of the lower laminate 16 to tear upon tab 30 pulling is due, at least in part, to the lower laminate 16 being free of or devoid of high strength polymers and foamed polymers (as mentioned above) in combination with the heat seal layer 20 forming a weld to the container 100.

By one approach, the tear or rupture strength of the lower laminate 16, the bond strength of the upper laminate 12 to the lower laminate 16, and the bond strength to the container 100 are selected such that the lower laminate 16 tears first before distal portions 114 of the heat seal layer 20 (or other layers of the lower laminate 16) separate from the container's rim 100. Once the lower laminate 16 tears, the bond formed via the bonding layer 34 between the upper laminate 12 and the lower laminate 16 is strong enough to hold such layers together (in the removable portion 112). Then, with continued application of an upward removal force on the tab 30, the remaining portions of the sealing member 10 (i.e., the removable portion 112) sequentially separates about the container's rim 100 without the upper layer 12 and tab structure 14 thereof separating from the lower laminate 16 or remaining portions 112 thereof. In other words and in some approaches, the tear strength or tear resistance of the lower laminate 16 is less than the bond strength of the heat seal 20 to the container 100 which are both less than the bond strength of the upper laminate 12 to the lower laminate 16 (as well as the tear strength or tear resistance of the upper laminate 12).

To achieve the multiple functionalities described above, the upper laminate 12 includes the insulation layer 40 (and the lower laminate 16 is devoid or free of such layers as discussed above) and the upper laminate 12 also has a minimized total thickness that includes, at most, about 50 to about 70 percent of its thickness being the insulation layer 40. In addition, the upper laminate 12 (and tab thereof) has select ratios of its total thickness to a total thickness of the one or more support layers 32 and 42 and the bonding layers 34 effective to achieve an upper laminate that provides insulation as well as remains bonded to the lower laminate portion 16 during removal in a structure that is as thin as possible. As used herein, the total thickness of the upper laminate 12 (and tab thereof) is exclusive of any optional adhesive layers bonding the various upper laminate layers together and, in some approaches, exclusive of any tab stock used to help form the tab.

Because the insulation layer 40 is above the bonding layer 34 and, thus, does not protect the bonding layer 34 from induction heat or other heat from the heat sealing operation, the ratios and thicknesses of the insulation layer 40, support layers 32 and 42, as well as the bonding layer 34 are selected to maintain the integrity of the tab during the heating and sealing operations. In particular, because the bonding layer 34 may be a heat-activated bonding layer, placing the insulation layer 40 above it in the overall seal structure exposes the bonding layer 40 to heat from the induction or conduction heating process and also tends to limit the amount of lamination heat down through the top of the seal (used during seal formation) that can be used to properly activate and bond the bonding layer 34 to the lower laminate 16. The selected structures, ratios, and volumes of the layers herein are specifically selected to form a seal that can properly function with the insulation layer 40 in such placement in the overall seal.

In some cases, the total thickness of the upper laminate 12 and/or tab structure 14 is only about 3 to about 7 mils (in some cases, about 3 to about 6 mils). By one approach, an effective ratio of this total thickness of the upper laminate 12 and/or tab structure 12 to a thickness of the one or more polymer support layers 34 and/or 42 is about 1:0.1 to about 1:0.25 when combined with the insulation layer 40 that is about 50 to about 70 percent of the tab thickness. (In other approaches, effective ratios may be about 1:0.15 to about 1:0.25 and, in yet other approaches, about 1:0.15 to about 1:0.20.) By another approach, an effective ratio of the total thickness of the upper laminate 12 and/or tab structure 12 to a total thickness of the bonding layer 34 is about 1:0.15 to about 1:0.25 when combined with the insulation layer 40 that is about 50 to about 70 percent of the tab total thickness. As used herein, total thickness of the upper laminate 12, the tab structure, and/or the gripping tab generally refers to the combined thickness of layer 42, layer 40, layer 32, and layer 34 to the extent such layers are present and exclusive of any adhesive layers used to hold or bond such layers together.

In one aspect of the disclosure herein, the combination of these ratios with the insulation layer in the upper laminate are effective such that the upper laminate 12 has a minimized construction and thickness (even with a thick insulation layer) to provide insulation effective for bonding the heat sealable layer 20 to a container rim and so that the removable portion 112 of the tamper indicating seal 10 remains in one piece upon a removal force applied to the gripping tab. The structure of the upper laminate 16 described herein generally consists of down gauging or a much thinner construction of the polymer support layers and bonding layers than previously thought possible in a tabbed sealing member to achieve tamper evidence with a foamed polymer layer. Even with the insulation layer 40 positioned above the bonding layer 34, the bonding layer 34 is effective to achieve the desired bonds without oozing and flowing during sealing. While not wishing to be limited by theory, it is believed this may be due, in part, to the selected ratios of layer thicknesses in the tab structure 14 and upper laminate 12.

Now that the basic structures of a sealing member suitable for a one-piece and a two-piece sealing member are set forth above, further details about the various layers and components of the sealing members are described in more detail.

Suitable adhesives, hot melt adhesives, or sealants for the heat sealable layer 20 include, but are not limited to, polyesters, polyolefins, ethylene vinyl acetate, ethylene-acrylic acid copolymers, surlyn, and other suitable materials. By one approach, the heat sealable layer 20 may be a single layer or a multi-layer structure of such materials about 0.2 to about 3 mils thick. The heat seal layer 20 may be configured to achieve a weld to the container rim, which is helpful in achieving the tamper evident features of the seals herein. In general, the bond strength needed to achieve a weld may vary depending on the size of the seal. By one approach, the bond strength of the weld may be greater than 15 gpi/mm of the seal's diameter, and in other approaches, may be between about 18 to about 22 gpi/mm of the seal's diameter (where gpi refers to grams per inch and mm refers to the diameter of the seal). In other cases, the weld bond to the container may be greater than about 18 gpi/mm, in other cases greater than about 20 gpi/mm, and in yet other cases, greater than about 22 gpi/mm to achieve a weld bond for tamper evident purposes.

By some approaches, the heat seal layer 20 is selected to have a composition similar to and/or include the same polymer type as the composition of the container. For instance, if the container contains polyethylene, then the heat seal layer 20 would also contain polyethylene. If the container contains polypropylene, then the heat seal layer 20 would contain polypropylene. If the container includes a polyolefin, then the heat seal layer would include a polyolefin. Other similar materials combinations are also possible. Such compatibility of heat seal polymer types and container polymer types aids in achieving a weld suitable for tamper evidence. The weld is achieved, in some approaches, by heating the heat seal layer 20 above its melting point.

By one approach, the membrane layer 18 may be one or more layers configured to provide induction heating and barrier characteristics to the seal. A layer configured to provide induction heating is any layer capable of generating heat upon being exposed to an induction current where eddy currents in the layer generate heat. By one approach, the membrane layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and also provide induction heating at the same time. Thus, the membrane layer may be one or more layers configured to provide such functionalities. By one approach, the membrane layer is about 0.3 to about 2 mils of a metal foil, such as aluminum foil, which is capable of providing induction heating and to function as an atmospheric barrier. Optionally, the membrane layer may be embossed or surface modified to include images or text thereon. In this case, the layers above the membrane layer may be transparent or translucent such that the membrane layer may be visible through the upper surface of the seal.

The adhesives useful for the adhesive layer 22 described herein include, for example, ethylene vinyl acetate (EVA), polyolefins, 2-component polyurethane, ethylene acrylic acid copolymers, curable two part urethane adhesives, epoxy adhesives, ethylene methacrylate copolymers and the like bonding materials. Other suitable materials may include low density polyethylene, ethylene-acrylic acid copolymers and ethylene methacrylate copolymers. By one approach, adhesive layer 22 may be a polyolefin layer. In addition, the various layers of the seals herein may also use a thin adhesive layer to secure or bond adjacent layers together as needed for a particular application. In general, these optional adhesive layers are not shown in the figures. Any of the above adhesives may be used for this purpose and may be about 0.3 to about 0.5 mils of adhesive (or less) coated thereon.

The bonding layer 34 may also include, for example, ethylene vinyl acetate (EVA), polyolefins, 2-component polyurethane, ethylene acrylic acid copolymers, curable two part urethane adhesives, epoxy adhesives, ethylene methacrylate copolymers and the like bonding materials. By one approach, the bonding layer 34 is a heat-activated bonding layer, such as EVA. In such approach, the bonding layer 34 may have a melting point of about 45° C. to about 100° C. (in some approaches, about 45 to about 80° C.). In general, EVA is effective for bonding layer 34 because of its thermal bonding characteristics, such that it readily bonds to layer 18. As described above, the bonding layer 34 has a selected thickness relative to the total thickness of the upper laminate 16 to help achieve functionality of the seal. To this end, if bonding layer 34 is too thick when the insulation layer 40 is positioned above it, it becomes difficult to achieve satisfactory bonds (that is, not enough lamination heating may be transferred downwardly during seal formation) and, in some instances, there may also too much volume or mass of EVA that tends to ooze out from the seal upon heating. If the bonding layer 34 is too thin, the bond strengths to the lower laminate 16 can be inadequate resulting in the tab peeling away from the lower laminate 16 upon seal removal. If the bonding layer 34 is too thin, then the tab 30 also does not have sufficient internal strength to prevent tearing. By one approach, bonding layer 34 is about 0.5 to about 1.5 mil of EVA and, in other approaches, about 0.5 to about 1.0 mils of EVA.

When the insulation layer 40 is positioned above the bonding layer 34 (and not in between the bonding layer and membrane layer), the insulation layer is not in a position to insulate layer 34 (such as an EVA layer) from the heat generated during heat sealing. Thus, selection of the size and volume of material for the bonding layer 34 helps to achieve the bonds described herein as well as to minimize and prevent oozing of this material and tab grab. By one approach, the bonding layer includes about 10 to about 250 $mm^3$ of material, such as EVA. In other approaches, the bonding layer may include about 10 to about 32 $mm^3$ of material, like EVA (such as with a 30 to 35 mm diameter seal) and in yet other approaches, about 80 to about 250 $mm^3$ of material, such as EVA (such as with a 80 to 100 mm diameter seal). Such volume of material is effective to achieve the desired bonds and minimize and prevent flowing and oozing during heat seal when the insulation layer 40 is above this layer.

The support layers 32, 42 and tab stock 36 can be selected from a variety of suitable non-foamed polymer materials. For example, the polymer materials can be selected from the group consisting of polyesters (such as polyethylene terephthalate (PET), polyethylene napthalate (PEN)), polyamides, polypropylenes, or a combination thereof. In one approach, the plastic materials for layers 32 and 42 may be transparent so that the lower laminate 16 can be visible to the end user. By another approach, support layers 32 and 42 may be formed from any strong heat resistant sheet-like material, which can maintain its strength at small thicknesses. By one approach, the support layers 32 and 42 may have a density of about 1 g/ml or more (and in some cases, from about 1 to about 1.5 g/ml). PET is a one such suitable material. Other suitable materials include PEN and nylon. By one approach, each of layers 32, 42, and 36 may be 0.3 to about 0.5 mils thick and in other approaches, about 0.36 to about 0.75 mils thick.

Insulation layer 40 is, by one approach, any layer capable of providing insulation and retention of the induction heat generated by the membrane layer 18 within the lower portions of the seal 10. By one approach, the insulation layer 40 is a foamed polymer layer such as a polyolefin foam, a polyethylene foam (PE), low density polyethylene foam (LDPE), coextruded LDPE, MDPE, and or HDPE foams, polyester foams, polypropylene foams (PP) and various mixtures or co-extruded blends thereof of a sufficient thickness to provide the insulation properties. By another approach, the insulation layer 40 may be expanded polyethylene foam. In yet another approach, insulation layer 40 may be a polyolefin or polyester foam about 2 to about 5 mils thick (and in other approaches, about 2.5 to about 4 mils thick) with a density of about 0.6 to about 0.9 g/ml. By another approach, the foam may be transparent or translucent so that a user or consumer may view, for example, writing or other printing underneath on the tab stock 36. By another approach, the upper laminate including the insulation layer has a construction permitting the membrane layer to be visible from an upper surface of the upper laminate. It will be appreciated that the exemplary thickness of layers 32, 34, 36, 40, and 42 noted above also satisfy the effective thickness percentages and ratios mentioned above to achieve the desired functionalities of the seal set forth herein.

The various layers of the sealing member are assembled via a lamination process forming a sheet of the described layers heating applied as needed to activate any heat-activated adhesives or bonding layers. Adhesive coating and/or extrusion lamination may also be used. The sheet of the sealing member 10 can be cut into appropriate sized disks or other shapes as needed to form a vessel closing assembly or tabbed sealing member. The cut sealing member is inserted into a cap or other closure which, in turn, is applied to the neck of a container to be sealed. The screw cap can be screwed on to the open neck of the container, thus sandwiching the sealing member between the open neck of the container and the top of the cap. Heat or induction current or other sealing is then applied to seal the bottom subassembly of layers forming the seal portion to the neck of the container.

It will be understood that various changes in the details, materials, and arrangements of the process, liner, seal, and combinations thereof, which have been herein described and illustrated in order to explain the nature of the products and methods may be made by those skilled in the art within the principle and scope of the embodied product as expressed in the appended claims. For example, the seals may include other layers within the laminate as needed for a particular application. Adhesive layers not shown in the figures may also be used, if needed, to secure various layers together.

What is claimed is:

1. A two-piece liner and tamper indicating seal for sealing to a rim of a container, the liner and seal comprising:
    an upper liner portion with a liner layer having a lower surface thereof with a temporary bonding layer configured to permit the upper liner portion to separate from remaining portions of the seal upon heat being applied;
    a tamper indicating tabbed seal portion having an upper surface releasably bonded to the upper liner portion and a lower surface configured for bonding to a container rim, the tamper indicating tabbed seal portion including
    a lower laminate including a heat sealable layer and an induction heating layer, the lower laminate configured for heat sealing the tamper indicating tabbed seal portion to a container rim;
    an upper laminate at least partially bonded to the lower laminate to form a gripping tab defined within a perimeter of the lower laminate, the upper laminate including a foamed polymer layer, one or more polymer support layers bonded to the foamed polymer layer, and a bonding layer forming the at least partial bond between the upper laminate and the lower laminate;

a total thickness of the upper laminate including about 50 to about 70 percent of the foamed polymer layer;

a ratio of the upper laminate total thickness to a thickness of the one or more polymer support layers from about 1:0.1 to about 1:0.25 and a ratio of the upper laminate total thickness to a thickness of the bonding layer from about 1:0.15 to about 1:0.25 such that the upper laminate has a construction to provide insulation effective for bonding the heat sealable layer to a container rim and so that at least portions of the tamper indicating tabbed seal portion remain in one piece upon a removal force applied to the gripping tab; and the lower laminate and the upper laminate have a construction effective to permit tearing of the lower laminate in response to a removal force applied to the gripping tab such that a first portion of the lower laminate including the heat sealable layer and the induction heating layer is configured to remain bonded to a container rim and a second portion of the lower laminate including the heat sealable layer and the induction heating layer is configured to remain bonded the upper laminate.

2. The liner and seal of claim 1, wherein the lower laminate is free of foamed polymers and polymers having a density greater than about 1 g/ml.

3. The liner and seal of claim 1, wherein the polymer support layer includes a first non-foam polymer layer bonded to an upper surface of the foamed polymer layer and a second non-foam polymer layer bonded to a lower surface of the foamed polymer layer.

4. The liner and seal of claim 1, wherein the foamed polymer layer has a density of about 0.6 to about 0.9 g/ml.

5. The liner and seal of claim 1, wherein the foamed polymer layer is a foamed polyolefin.

6. The liner and seal of claim 1, wherein the bonding layer is selected from the group consisting of ethylene vinyl acetate, polyolefins, 2-component polyurethane, ethylene acrylic acid copolymers, curable two part urethane adhesives, epoxy adhesives, and ethylene methacrylate copolymers.

* * * * *